US012103441B2

(12) United States Patent
Jeong et al.

(10) Patent No.: US 12,103,441 B2
(45) Date of Patent: Oct. 1, 2024

(54) VEHICLE SEAT (71) Applicants: Hyundai Motor Company, Seoul (KR); Kia Corporation, Seoul (KR); Hyundai Transys Inc., Seosan-si (KR)

(72) Inventors: Dong Woo Jeong, Whasung-Si (KR); Eun Sue Kim, Whasung-Si (KR); Dae Hee Lee, Whasung-Si (KR); Myung Hoe Kim, Whasung-Si (KR); Jun Sik Hwang, Whasung-Si (KR); Gwon Hwa Bok, Whasung-Si (KR); Hae Dong Kwak, Whasung-Si (KR); Jae Sung Shin, Whasung-Si (KR); Han Kyung Park, Whasung-Si (KR); Jae Hoon Cho, Whasung-Si (KR)

(73) Assignees: Hyundai Motor Company, Seoul (KR); Kia Corporation, Seoul (KR); HYUNDAI TRANSYS INC., Seosan-si (KR)

( * ) Notice: Subject to any disclaimer, the term of this patent is extended or adjusted under 35 U.S.C. 154(b) by 80 days.

(21) Appl. No.: 17/993,476

(22) Filed: Nov. 23, 2022

(65) Prior Publication Data
US 2023/0191960 A1 Jun. 22, 2023

(30) Foreign Application Priority Data
Dec. 20, 2021 (KR) ........................ 10-2021-0182339

(51) Int. Cl.
*B60N 2/20* (2006.01)
*B60N 2/34* (2006.01)

(52) U.S. Cl.
CPC ............... *B60N 2/203* (2013.01); *B60N 2/34* (2013.01)

(58) Field of Classification Search
CPC .......... B60N 2/203; B60N 2/34; B60N 2/143; B60N 2/3011; B60N 2/045; B60N 2/146; B60N 2/3013; B60N 2/305; B60N 2/36
See application file for complete search history.

(56) References Cited

U.S. PATENT DOCUMENTS

| | | | | |
|---|---|---|---|---|
| 4,913,498 A | * | 4/1990 | Forlivio ............... | B60N 2/3084 297/238 |
| 4,986,600 A | * | 1/1991 | Leblanc ............... | B60N 2/3084 297/238 |
| 7,517,016 B1 | * | 4/2009 | West .................... | B60N 2/3086 297/240 |

(Continued)

*Primary Examiner* — Mark R Wendell
(74) *Attorney, Agent, or Firm* — MORGAN, LEWIS & BOCKIUS LLP (57) ABSTRACT

A vehicle seat includes first and second sub-seatbacks also provided as first and second seat cushions mounted on a main seatback to be rotatable in forward-rearward directions. A forward facing position in which an occupant is accommodated while viewing forward and a rearward facing position in which the occupant is accommodated while viewing rearward is easily realized, in response to forward and rearward rotation of the first sub-seatback and the second sub-seatback also provided as first and second seat cushions. Furthermore, a full-bed mode in which the seat is horizontally spread like a bed, a cushion tip-up mode in which the entirety of the seat is positioned upright for ensuring freight loading and an occupant entering and exiting passage, and the like are realized.

12 Claims, 6 Drawing Sheets

(56) References Cited

U.S. PATENT DOCUMENTS

| | | | |
|---|---|---|---|
| 7,631,931 B2* | 12/2009 | Langensiepen | B60N 3/102 |
| | | | 297/411.32 |
| 2017/0050538 A1* | 2/2017 | Akimoto | B60N 2/20 |
| 2018/0079329 A1* | 3/2018 | Theander | B60N 2/2863 |
| 2022/0219582 A1* | 7/2022 | Moon | B60N 2/015 |
| 2023/0406171 A1* | 12/2023 | Aita | B60N 2/7094 |

* cited by examiner

VEHICLE SEAT

CROSS REFERENCE TO RELATED APPLICATION

The present application claims priority to Korean Patent Application No. 10-2021-0182339, filed Dec. 20, 2021, the entire contents of which is incorporated herein for all purposes by this reference.

BACKGROUND OF THE PRESENT DISCLOSURE

Field of the Present Disclosure

The present disclosure relates, generally, to a vehicle seat, and more particularly, to a vehicle seat having a novel structure allowing an occupant to be accommodated on the vehicle seat while viewing forward or rearward thereof.

Description of Related Art

Generally, a vehicle seat is fabricated with a structure essentially comprised of a seat cushion allowing an occupant to be accommodated thereon, a seatback supporting the back of the occupant, a headrest supporting the neck and the head of the occupant, and the like. Furthermore, various seat position adjustment mechanisms are used in seats so that changes in the seat position may be freely performed according to the body shape of the occupant and the situation.

For example, various seat position adjustment mechanisms may include a seat height adjustment mechanism, a mechanism for realizing a relaxing comfort position, a swivel mechanism facilitating the entirety of the seat to be rotated about 180° in the lateral direction, and the like.

Such seat position adjustment mechanisms have drawbacks, such as a complicated structure and an excessive number of components. Because the excessive number of components are used, the labor of assembly and costs are increased, and the weight of a vehicle is also increased, which are problematic.

Thus, a simplified seat position adjustment mechanism is required.

Because a purpose-built vehicle (PBV), a type of autonomous vehicle, is designed and fabricated for a variety of purposes and space uses, such as a living and resting space, a meeting and conversation space, and a cargo space, the internal space of the PBV in which seats are provided is necessarily limited. Thus, the seat position adjustment mechanism may be applied in a simplified structure to meet the purpose.

For example, the swivel mechanism of the related art may be operated to rotate the entirety of the seat 180° so that a position in which an occupant is accommodated while viewing forward or viewing rearward may be realized. However, it is difficult to obtain a space for rotation of the seat in the limited internal space. When the seat rotates, the seat may interfere with surrounding components. Considering these problems, a more efficient and more simplified seat rotating mechanism meeting the purpose of the rotation of the seat is required.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a vehicle seat in which first and second sub-seatbacks also provided as first and second seat cushions are mounted on a main seatback to be rotatable in forward-rearward directions, so that a forward facing position in which an occupant is accommodated while viewing forward and a rearward facing position in which the occupant is accommodated while viewing rearward may be easily realized, in response to forward and rearward rotation of the first sub-seatback and the second sub-seatback also provided as first and second seat cushions. Furthermore, a full-bed mode in which the seat may be horizontally spread like a bed, a cushion tip-up mode in which the entirety of the seat may be positioned upright for ensuring freight loading and an occupant entering and exiting passage, and the like may be realized.

In various aspects of the present disclosure, there is provided a vehicle seat including: a seat support structure to which recliners are mounted on first and second side portions thereof; a main seatback configured including an open area and both bottom portions connected to the recliners; and a first sub-seatback also provided as a first seat cushion and a second sub-seatback also provided as a second seat cushion, wherein the first sub-seatback and the second sub-seatback are rotatably connected to the seat support structure to be disposed in the open area of the main seatback or a position in which a lower body of an occupant is accommodated.

The open area of the main seatback may extend in forward-rearward directions and is open in a bottom direction thereof.

The vehicle seat may further include a hinge bracket provided in a position inside the recliners of the seat support structure, bottom end portions of the first sub-seatback and the second sub-seatback being rotatably connected to the hinge bracket.

A first hinge frame and a second hinge frame may be formed on bottom end portions of the first sub-seatback and the second sub-seatback to overlap each other and be hinged to the hinge bracket.

A headrest including concave head support regions on front and rear portions may be connected to a top portion of the main seatback.

A locking unit may be mounted on each of the first sub-seatback and the second sub-seatback to be locked to the main seatback.

The locking unit may include: a lever rotatably mounted on an external surface of each of the first sub-seatback and the second sub-seatback; a rotatable block rotatably mounted on an internal frame of each of the first sub-seatback and the second sub-seatback; a rotatable shaft fixedly connected to the lever and the rotatable block; and a locking plate including a bottom end portion hinged to a rotatable link formed on a side portion of the rotatable block, and including a locking pin being formed on a top end portion. The locking pin of the locking plate may be detachably inserted into and locked to a locking hole formed on an internal frame of the main seatback, the locking hole being exposed from a bottom surface of the main seatback.

Both-side lower portions of the seat support structure may be connected to movable rails movably fastened to fixed rails.

When the second sub-seatback is positioned in the open area of the main seatback and the first sub-seatback is rotated forward and horizontally deployed, a forward facing position in which the occupant is allowed to be accommodated while viewing forward may be realized.

When the first sub-seatback is positioned in the open area of the main seatback and the second sub-seatback is rotated rearward and horizontally deployed, a rearward facing position in which the occupant may be allowed to be accommodated while viewing rearward is realized.

When the first sub-seatback and the second sub-seatback are positioned in the open area of the seatback to be in a vertically positioned state while overlapping each other, a cushion tip-up mode for ensuring freight loading and an occupant entering and exiting passage may be realized.

When the first sub-seatback is horizontally deployed and the main seatback is reclined rearward together with the second sub-seatback and horizontally disposed or the second sub-seatback is horizontally deployed and the first sub-seatback of the main seatback is reclined forward together with the first sub-seatback and horizontally disposed, a full-bed mode may be realized.

According to an exemplary embodiment of the present disclosure, the following effects are provided.

First, the first sub-seatback and the second sub-seatback also provided as first and second seat cushions are mounted in the open area of the main seatback to be rotatable in forward-rearward directions, so that a forward facing position in which an occupant is accommodated while viewing forward and a rearward facing position in which the occupant is accommodated while viewing rearward may be easily realized, in response to forward and rearward rotation of the first sub-seatback and the second sub-seatback also provided as first and second seat cushions.

Second, in a position in which one sub-seatback also provided as a seat cushion is horizontally deployed, the main seatback and the other sub-seatback may be reclined, realizing the full-bed mode in which an occupant may take a rest as if lying on a bed.

Third, the first sub-seatback and the second sub-seatback also provided as first and second seat cushions are disposed in the open area of the main seatback to overlap each other, realizing a cushion tip-up mode in which the entirety of the seat is in a vertically positioned state. Thus, it is possible to obtain a wide space for ensuring freight loading and an occupant entering and exiting passage.

Fourth, compared to the conventional swivel mechanism able to rotate the seat in the lateral direction, the seat rotating mechanism has a simpler structure and the significantly-reduce number of components. Thus, the seat rotating mechanism is more efficient and simplified to meet the purpose of rotation of the seat.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, example embodiments of the present disclosure will be described in detail with reference to the accompanying drawings.

Figure 1:
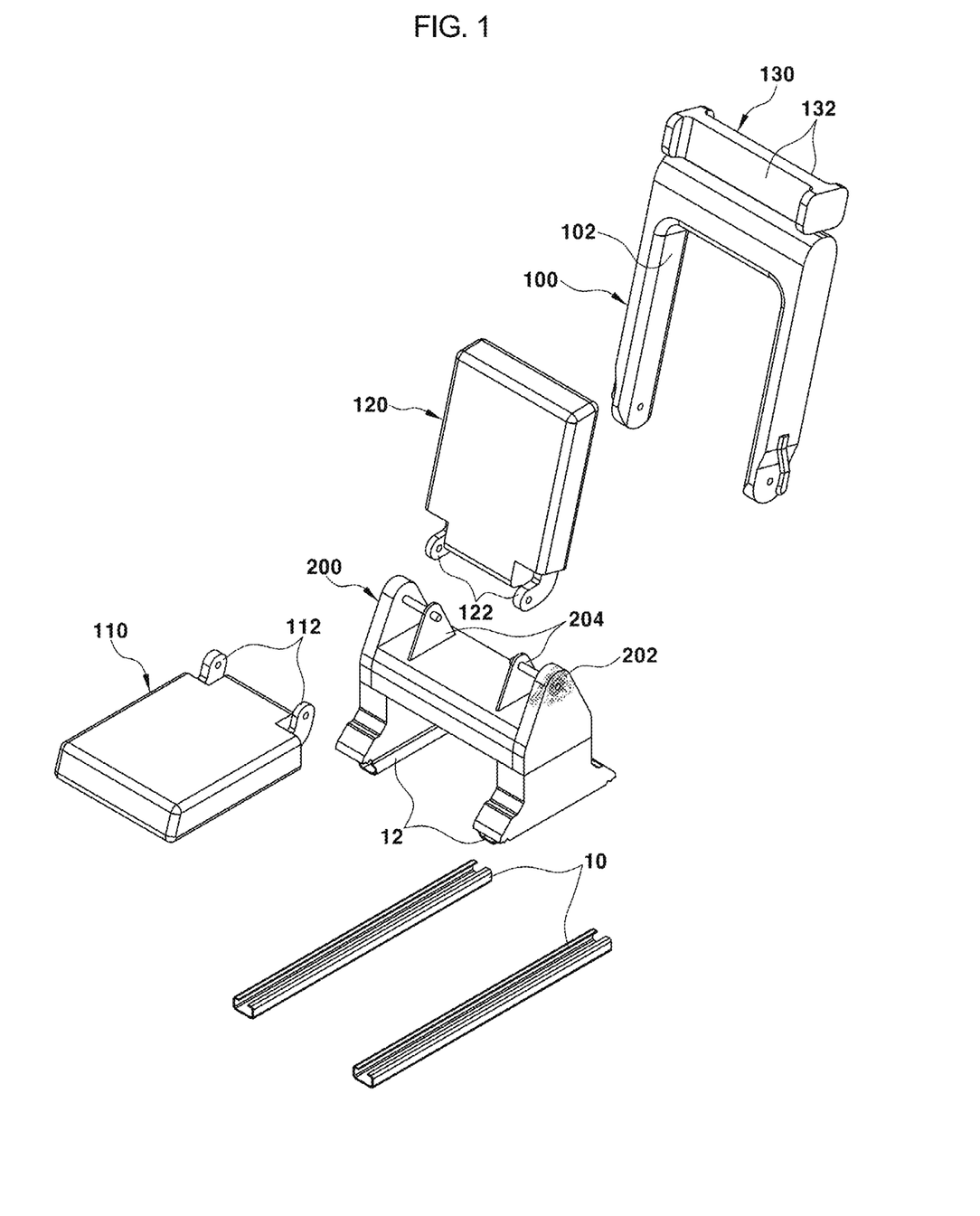
FIG. 1 is an exploded perspective view exemplarily illustrating a vehicle seat according to an exemplary embodiment of the present disclosure.
Figure 2:
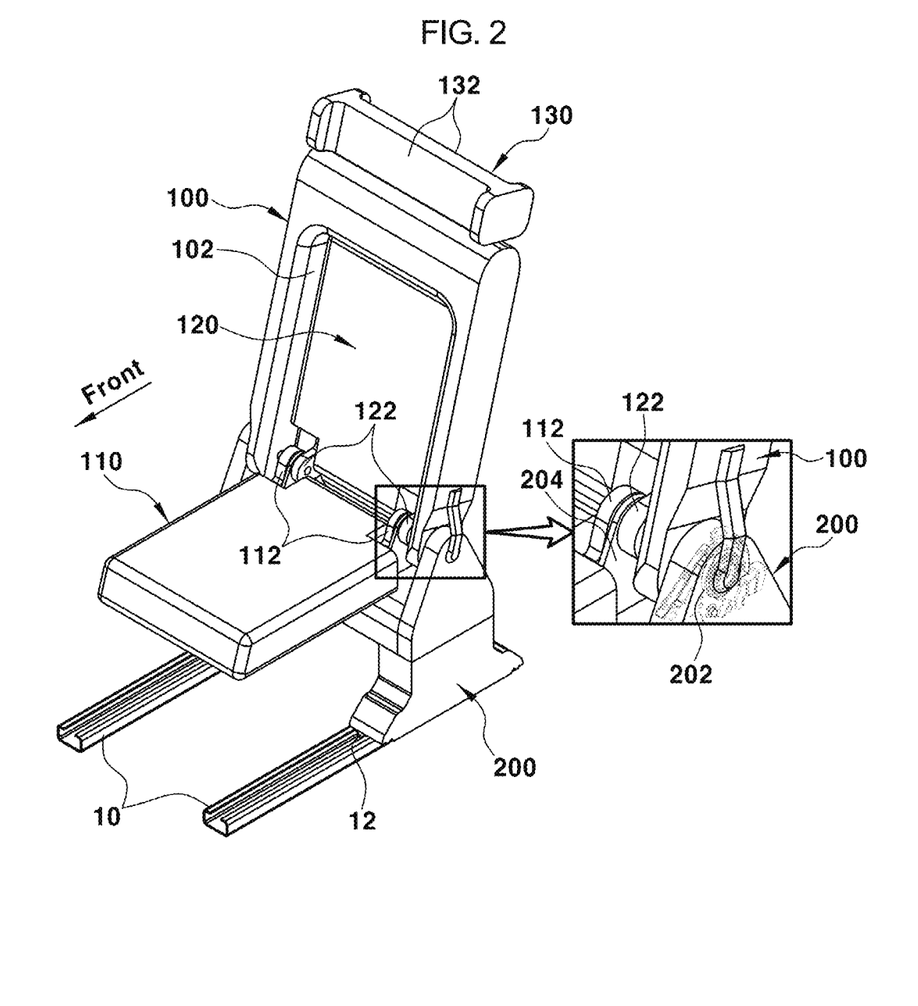
FIG. 2 is a perspective view exemplarily illustrating the vehicle seat according to an exemplary embodiment of the present disclosure disposed in a forward facing position.

FIG. 1 is an exploded perspective view exemplarily illustrating a vehicle seat according to an exemplary embodiment of the present disclosure, and FIG. 2 is a perspective view exemplarily illustrating the vehicle seat according to an exemplary embodiment of the present disclosure disposed in a forward facing position.

As illustrated in FIG. 1 and FIG. 2, relatively-long fixed rails 10 are mounted on a floor panel in the internal space of a vehicle. Movable rails 12 are fastened to the fixed rails 10 to be movable in forward-rearward directions. The movable rails 12 are fixedly mounted on both bottom portions of a seat support structure 200.

Thus, the seat support structure 200 may move in forward-rearward directions together with the movable rails 12 along the fixed rails 10, and the forward-rearward position of the seat mounted on the seat support structure 200.

The seat support structure 200 is configured so that recliners 202 provided as reclining units are mounted on both side portions thereof.

The recliners 202 are operating units configured to recline a main seatback 100 forward or rearward thereof. Because the recliners 202 are well known in the field of vehicle seats, a detailed description thereof will be omitted.

The main seatback 100 is configured so that an open area 102 is formed, and bottoms of side portions of the open area 102 are connected to the recliners 202.

Here, the open area 102 of the main seatback 100 extends in the forward-rearward directions and has the shape of a hole (e.g., an oblong hole) opened in the bottom direction thereof. Thus, the open area 102 may be used as a space in which a sub-seatback 110 also provided as a first seat cushion or a sub-seatback 120 also provided as a second seat cushion is positioned.

The sub-seatback 110 also provided as a first seat cushion and the sub-seatback 120 also provided as a second seat cushion are rotatably connected to the seat support structure 200. The sub-seatback 110 and the sub-seatback 120 may be positioned in the open area 102 of the main seatback 100 or disposed in a position on which the lower body of an occupant may be accommodated.

In this regard, hinge brackets 204 to which the lower portions of the sub-seatback 110 also provided as a first seat cushion and the sub-seatback 120 also provided as a second seat cushion are rotatably connected are provided at internal positions of the recliners 202 of the seat support structure 200.

Furthermore, first hinge frames 112 and second hinge frames 122 are provided on both-side lower portions or rear portions of the sub-seatback 110 also provided as a first seat cushion and the sub-seatback 120 also provided as a second seat cushion. The first hinge frames 112 and second hinge frames 122 are hinged-fastened to the hinge brackets 204 in an overlapping manner.

Thus, the first hinge frames 112 and the second hinge frames 122 are positioned outside the hinge brackets 204 while overlapping each other, and are rotatably fastened using hinge pins or the like. Thus, the sub-seatback 110 also provided as a first seat cushion and the sub-seatback 120 also provided as a second seat cushion are rotatable in the forward-rearward directions.

Furthermore, when the sub-seatback 110 also provided as a first seat cushion or the sub-seatback 120 also provided as a second seat cushion is positioned in the open area 102 of the main seatback 100, the sub-seatback 110 also provided as a first seat cushion or the sub-seatback 120 also provided as a second seat cushion is locked and maintained in a fixed position to support pressure applied thereto from the back of the occupant.

In this regard, a locking unit configured to be locked to the main seatback 100 is mounted on each of the sub-seatback 110 also provided as a first seat cushion and the sub-seatback 120 also provided as a second seat cushion.

Figure 3:
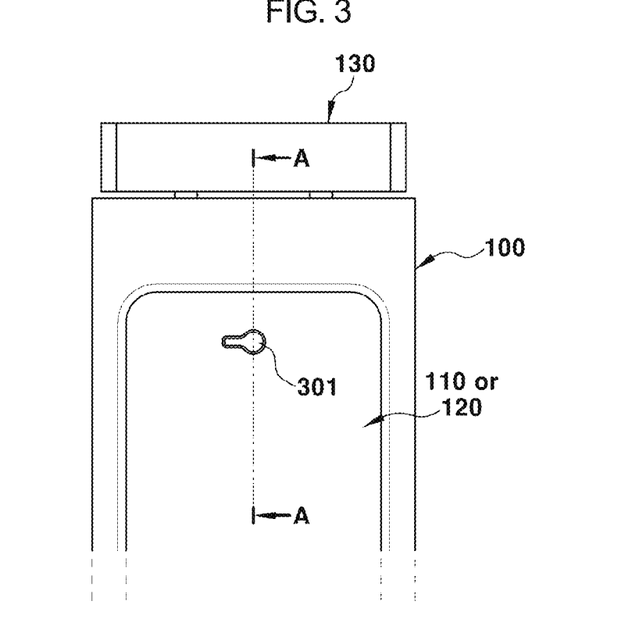
FIG. 3 is a front view exemplarily illustrating a situation in which the locking lever mounted on the sub-seatback also provided as a seat cushion among the components of the vehicle seat according to an exemplary embodiment of the present disclosure is in the unlocked position.
Figure 4:
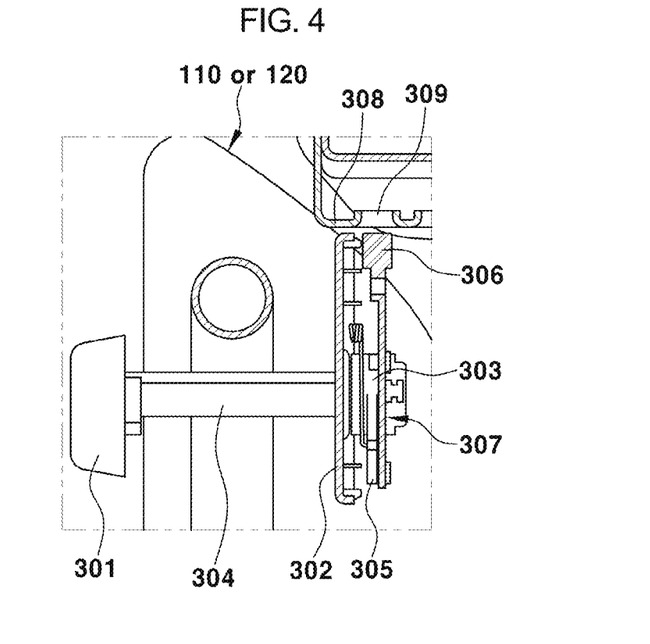
FIG. 4 is a cross-sectional view taken along the line A-A in FIG. 3.

As illustrated in FIG. 3 and FIG. 4, the locking unit may include: a lever 301 rotatably mounted on the external surface of each of the sub-seatback 110 also provided as a first seat cushion and the sub-seatback 120 also provided as a second seat cushion; a rotatable block 303 rotatably mounted on an internal frame 302 of each of the sub-seatback 110 also provided as a first seat cushion and the sub-seatback 120 also provided as a second seat cushion; a rotatable shaft 304 connected to the lever 301 and the rotatable block 303; a rotatable link 305 protruding from a side portion of the rotatable block 303; and a locking plate 307 including the bottom end portion hinged to the rotatable link 305 and including a locking pin 306 formed on the top end portion.

Furthermore, a lock hole 309 is formed in an internal frame 308 of the main seatback 100 to be exposed from the bottom surface of the main seatback 100 so that the locking pin 306 of the locking plate 307 is detachably fitted into and locked to the lock hole 309.

Figure 5:
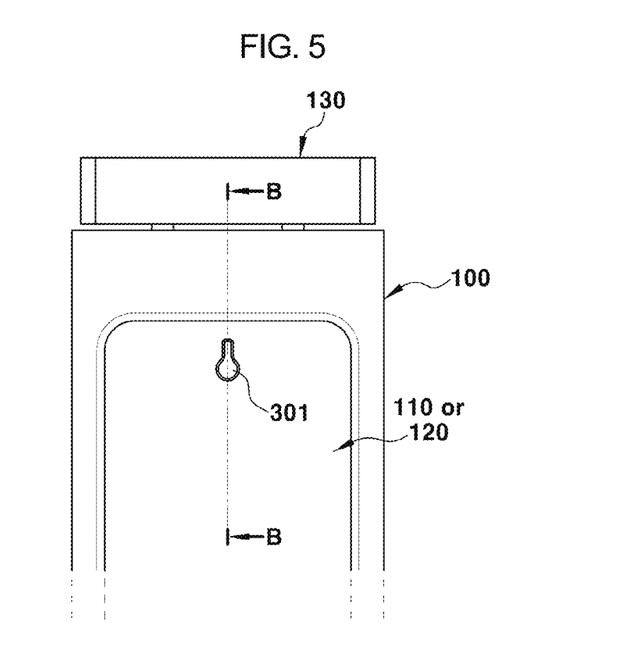
FIG. 5 is a front view exemplarily illustrating a situation in which the locking lever mounted on sub-seatback also provided as a seat cushion among the components of the vehicle seat according to an exemplary embodiment of the present disclosure is rotated to the locked position.
Figure 6:
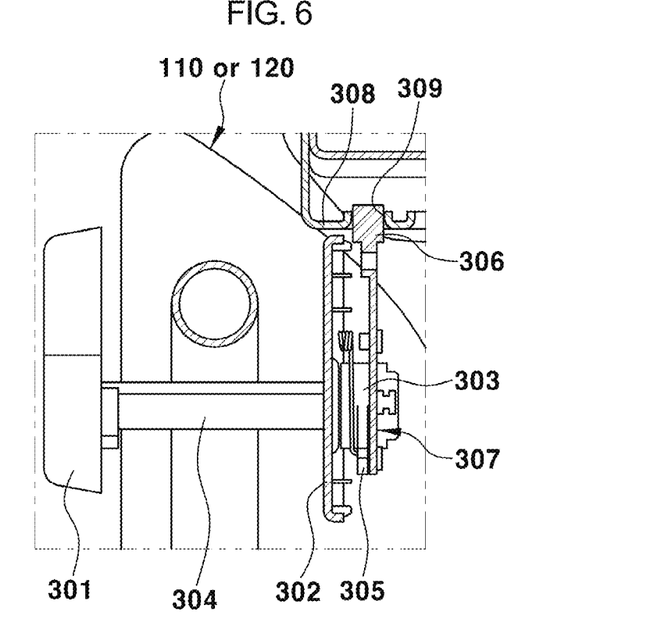
FIG. 6 is a cross-sectional view taken along the line B-B in FIG. 5.

Thus, when the lever 301 is rotated to the locked position as illustrated in FIG. 5, the rotatable shaft 304 and the rotatable block 303 connected to the lever 301 are rotated in the locked position, and at a same time, the rotatable link 305 provided on the rotatable block 303 is rotated in the top direction thereof. Subsequently, the locking plate 307 hinged to the rotatable link 305 is pushed upwards. Consequently, as illustrated in FIG. 6, the locking pin 306 provided on the top end portion of the locking plate 307 may be inserted into and locked to the lock hole 309 exposed from the bottom surface of the main seatback 100.

Because the locking pin 306 of the locking plate 307 is moved upwards from inside each of the sub-seatback 110 also provided as a first seat cushion and the sub-seatback 120 also provided as a second seat cushion and is inserted into and locked to the lock hole 309 of the main seatback 100, the sub-seatback 110 also provided as a first seat cushion or the sub-seatback 120 also provided as a second seat cushion may be positioned fixed to the open area 102 of the main seatback 100.

Furthermore, a headrest 130 including concave head support regions 132 on the front and rear portions is connected to the top portion of the main seatback 100. Thus, regardless of whether the occupant is accommodated while viewing forward or rearward thereof, the head of the occupant may be properly supported on the corresponding head support region 132.

Here, an operation flow of the vehicle seat including the above-described configuration according to an exemplary embodiment of the present disclosure will be referred to as follows.

When the sub-seatback 120 also provided as a second seat cushion is positioned in the open area 102 of the main seatback 100, and at a same time, the sub-seatback 110 also provided as a first seat cushion is rotated forward and horizontally deployed so that the lower body of the occupant is accommodated on the sub-seatback 110, a forward facing position in which the occupant is accommodated while viewing forward as illustrated in FIG. 2 may be realized.

Here, the lever 301 mounted on the sub-seatback 120 also provided as a second seat cushion may be rotated in the locked direction so that the locking pin 306 of the locking plate 307 is inserted into and locked to the lock hole 309 exposed from the bottom surface of the main seatback 100 as described above. In the present manner, the sub-seatback 120 also provided as a second seat cushion may be maintained in a fixed state so that the occupant may rest his or her back on the sub-seatback 120.

Figure 7:
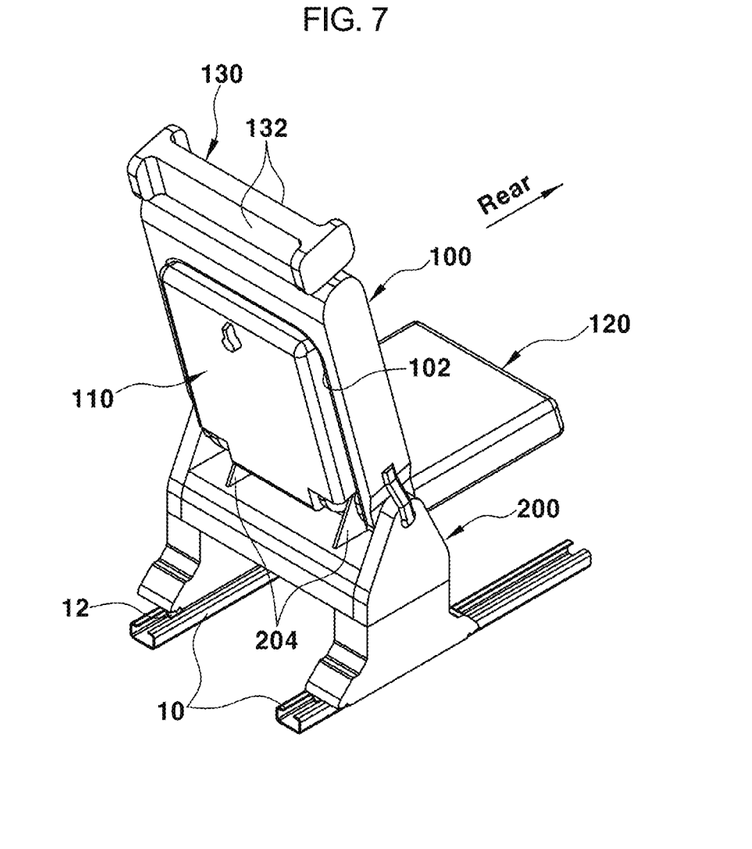
FIG. 7 is a perspective view exemplarily illustrating the vehicle seat according to an exemplary embodiment of the present disclosure disposed in a rearward facing position.

In contrast, when the sub-seatback 110 also provided as a first seat cushion is disposed in the open area 102 of the main seatback 100 and the sub-seatback 120 also provided as a second seat cushion is rotated rearward and horizontally deployed so that the occupant may be accommodated on the vehicle seat, a rearward facing position in which the occupant sees rearward as illustrated in FIG. 7 may be realized.

Here, the lever 301 mounted on the sub-seatback 110 also provided as a first seat cushion may be rotated in the locked position so that the locking pin 306 of the locking plate 307 is inserted into and locked to the lock hole 309 exposed from the bottom surface of the main seatback 100. In the present manner, the sub-seatback 110 also provided as a first seat cushion may be maintained in a fixed state so that the occupant may rest his or her back on the sub-seatback 110.

Figure 8:
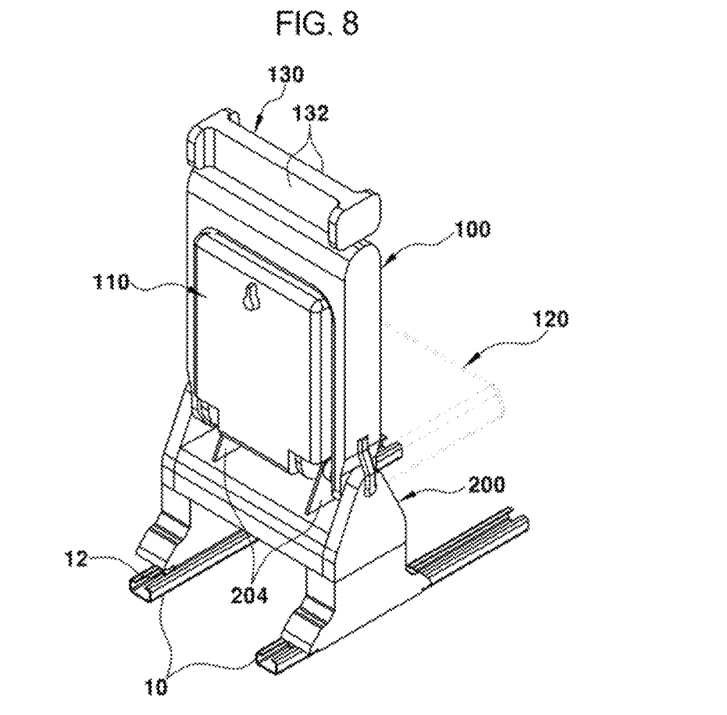
FIG. 8 is a perspective view exemplarily illustrating the vehicle seat according to an exemplary embodiment of the present disclosure disposed in a cushion tip-up mode.

Furthermore, when the sub-seatback 110 also provided as a first seat cushion and the sub-seatback 120 also provided as a second seat cushion are rotated into the open area 102 of the main seatback 100 to be in a vertically positioned state while overlapping as illustrated in FIG. 8, a cushion tip-up mode for ensuring freight loading and an occupant entering and exiting passage may be realized. Thus, it is possible to obtain a wide space for ensuring freight loading and the occupant entering and exiting passage.

Here, the lever 301 mounted on each of the sub-seatback 110 also provided as a first seat cushion and the sub-seatback 120 also provided as a second seat cushion may be rotated in the locked direction so that the locking pin 306 of the locking plate 307 is inserted into and locked to the lock hole 309 exposed from the bottom surface of the main seatback 100. In the present manner, both the sub-seatback 110 also provided as a first seat cushion and the sub-seatback 120 also provided as a second seat cushion may be fixed in a vertically positioned state.

Figure 9:
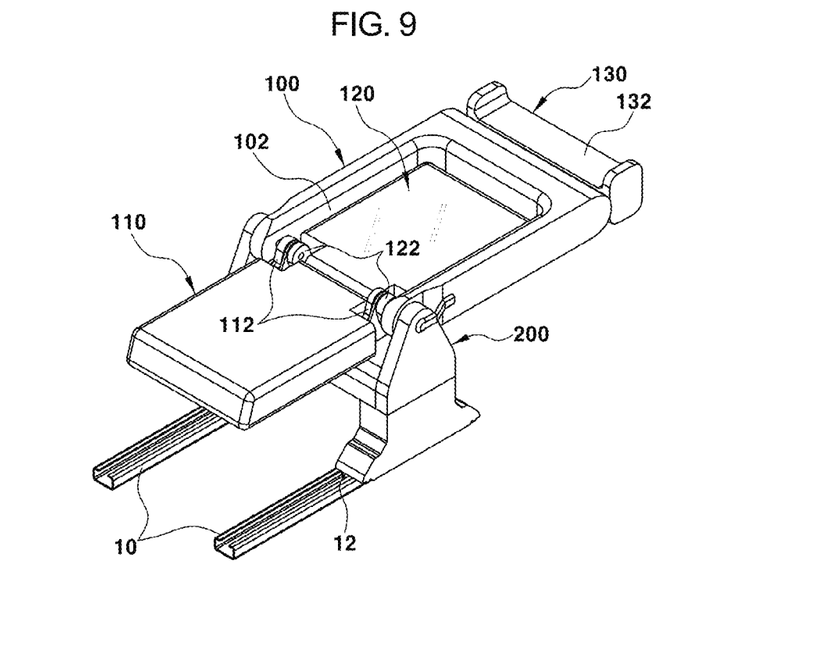
FIG. 9 is a perspective view exemplarily illustrating the vehicle seat according to an exemplary embodiment of the present disclosure disposed in a full-bed mode.

Furthermore, in a position in which the sub-seatback 110 also provided as a first seat cushion is horizontally deployed, the main seatback 100 may be reclined rearward together with the sub-seatback 120 also provided as a second seat cushion in response to the operation of the recliners 202 so that the main seatback 100 and the sub-seatback 120 are horizontally disposed. In a position in which the sub-seatback 120 also provided as a second seat cushion is horizontally deployed, the main seatback 100 may be reclined forward together with the sub-seatback 110 also provided as a first seat cushion in response to the operation of the recliners 202 so that the main seatback 100 and the sub-seatback 120 are horizontally disposed. Accordingly, as illustrated in FIG. 9, a full-bed mode allowing the occupant to take a rest as if lying on a bed may be realized.

As set forth above, it is possible to provide the vehicle seat (in particular, for a purpose-built vehicle (PBV)) configured so that a variety of seat positions may be adjusted. The seat positions include the forward facing position in which the occupant sees forward, the rear facing position in which the occupant sees rearward thereof, the full-bed mode in which the occupant may take a rest as when lying on a bed, and the cushion tip-up mode in which the freight loading space and the occupant entrance and exiting passage may be provided.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A vehicle seat apparatus comprising:
    a seat support structure to which recliners are mounted on first and second side portions thereof;
    a main seatback including an open area therein and including bottom corners respectively connected to the recliners; and
    a first sub-seatback-cum-seat cushion and a second sub-seatback-cum-seat cushion, which are rotatably connected to the seat support structure to be disposed in the open area of the main seatback or in a position in which a lower body of an occupant is accommodated,
    wherein, when a first sub-seatback is positioned in the open area of the main seatback and a second sub-seatback is rotated rearward and horizontally deployed, a rearward facing position in which the occupant is allowed to be accommodated while viewing rearward is realized.

2. The vehicle seat apparatus of claim 1, wherein the open area of the main seatback is a through-hole defined by a frame of the main seatback which is open in a bottom direction thereof.

3. The vehicle seat apparatus of claim 2, wherein the first sub-seatback-cum-seat cushion is selectively disposed at a first surface of the through-hole of the main seatback and the second sub-seatback-cum-seat cushion is selectively disposed at a second surface of the through-hole of the main seatback.

4. The vehicle seat apparatus of claim 1, wherein a headrest including concave head support regions on front and rear portions thereof are connected to a top portion of the main seatback.

5. The vehicle seat apparatus of claim 1, wherein a locking unit is mounted on each of the first sub-seatback and the second sub-seatback to be selectively locked to the main seatback.

6. The vehicle seat apparatus of claim 5, wherein the locking unit includes:
    a lever rotatably mounted on an external surface of each of the first sub-seatback and the second sub-seatback;
    a rotatable block rotatably mounted on an internal frame of each of the first sub-seatback and the second sub-seatback;
    a rotatable shaft fixedly connected to the lever and the rotatable block; and
    a locking plate including a bottom end portion hinged to a rotatable link formed on a side portion of the rotatable block, and including a locking pin being formed on a top end portion thereof,
    wherein the locking pin of the locking plate is detachably inserted into and locked to a locking hole formed on an internal frame of the main seatback according to rotation of the lever.

7. The vehicle seat apparatus of claim 6, wherein the locking hole is exposed from a bottom surface of the main seatback.

8. The vehicle seat apparatus of claim 1, wherein both-side lower portions of the seat support structure are connected to movable rails movably fastened to fixed rails.

9. The vehicle seat apparatus of claim 1, wherein, when the second sub-seatback is positioned in the open area of the main seatback and the first sub-seatback is rotated forward and horizontally deployed, a forward facing position in which the occupant is allowed to be accommodated while viewing forward is realized.

10. The vehicle seat apparatus of claim 1, wherein, when the first sub-seatback and the second sub-seatback are positioned in the open area of the seatback to be in a vertically positioned state while overlapping each other, a cushion tip-up mode for ensuring freight loading and an occupant entering and exiting passage is realized.

11. including
A vehicle seat apparatus comprising:
a seat support structure to which recliners are mounted on first and second side portions thereof;
a main seatback including an open area therein and including bottom corners respectively connected to the recliners;
a first sub-seatback-cum-seat cushion and a second sub-seatback-cum-seat cushion, which are rotatably connected to the seat support structure to be disposed in the open area of the main seatback or in a position in which a lower body of an occupant is accommodated; and
a hinge bracket provided in a position inside the recliners of the seat support structure, bottom end portions of the first and second sub-seatback-cum-seat cushions being rotatably connected to the hinge bracket,
wherein a first hinge frame and a second hinge frame are formed on bottom end portions of a first sub-seatback and a second sub-seatback, respectively, to overlap each other and be hinged to the hinge bracket.

12. A vehicle seat apparatus comprising:
a seat support structure to which recliners are mounted on first and second side portions thereof;
a main seatback including an open area therein and including bottom corners respectively connected to the recliners; and
a first sub-seatback-cum-seat cushion and a second sub-seatback-cum-seat cushion, which are rotatably connected to the seat support structure to be disposed in the open area of the main seatback or in a position in which a lower body of an occupant is accommodated,
wherein, when a first sub-seatback is horizontally deployed and the main seatback is reclined rearward together with a second sub-seatback and horizontally disposed or the second sub-seatback is horizontally deployed and the first sub-seatback of the main seatback is reclined forward together with the first sub-seatback and horizontally disposed, a full-bed mode is realized.

* * * * *